Patented Feb. 9, 1926.

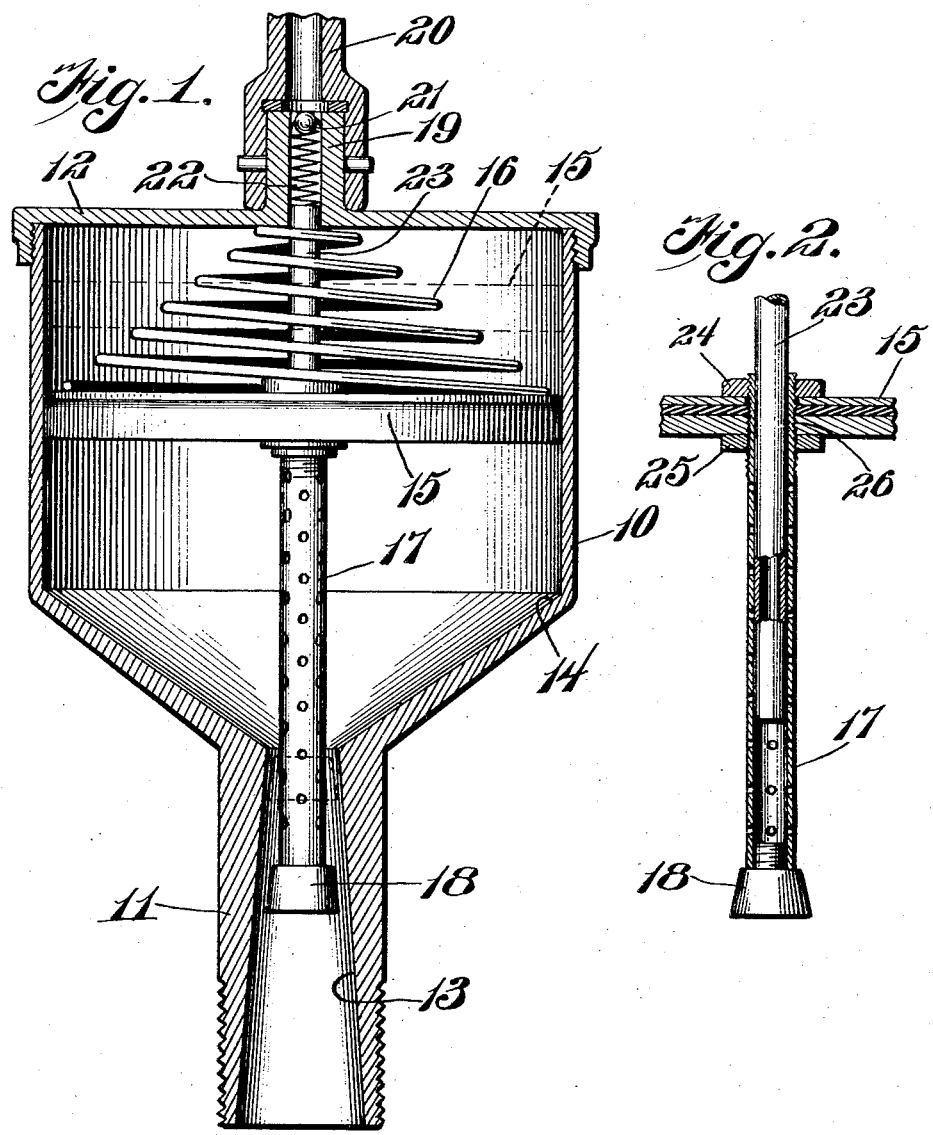

1,572,415

UNITED STATES PATENT OFFICE.

JOHN L. WILLIAMS AND FRANK L. WILLIAMS, OF WAKITA, OKLAHOMA.

GREASE CUP.

Application filed March 26, 1925. Serial No. 18,474.

*To all whom it may concern:*

Be it known that we, JOHN L. WILLIAMS and FRANK L. WILLIAMS, citizens of the United States, residing at Wakita, in the county of Grant and State of Oklahoma, have invented certain new and useful Improvements in Grease Cups, of which the following is a specification, reference being had to the accompanying drawings.

This invention relates to improvements in grease cups and has for an important object thereof the provision of a grease cup having combined advantages of the present system of lubricating by use of grease guns and of an automatic forced feed grease cup.

An important object of the invention is to provide a forced feed structure in a grease cup by means of which substantially uniform feeding of the grease will be had and including means for increasing the size of the bore through which the grease is fed as the strength of the spring forcing the grease from the cup decreases.

A further object of the invention is to provide a cup of this character having means whereby it may be filled through the medium of a grease gun and so constructed that when completely filled, the entire pressure applied by the grease gun is placed upon the outlet port of the grease cup to force the grease through the parts of the bearing being lubricated.

These and other objects we attain by the construction shown in the accompanying drawings, wherein for the purpose of illustration is shown a preferred embodiment of our invention and wherein:—

Figure 1 is a vertical sectional view through a grease cup constructed in accordance with our invention; and Figure 2 is a sectional view through the combined guide and refilling pipe and the coacting portions of the plunger and control valve support.

Referring now more particularly to the drawings, the cup comprises a hollow cylindrical body 10 having at its lower end an outlet 11 and at its upper end a cap 12. The outlet 11 has a tapered bore 13, the purpose of which will presently appear. The body of the cup is preferably interiorly reduced adjacent its lower end, as at 14, so that a piston 15 moving within the cup will be limited in its movement toward the lower or outlet end. Between the cap and this piston a spiral spring 16 is disposed, this spring being so formed that when flattened, the coils thereof do not overlie one another for a purpose presently to appear. Secured to this piston is a depending perforated pipe 17, the lower end of which has secured thereto a plug 18. This plug 18, when the piston is in its uppermost position, nearly closes the tapered bore 13 and as the piston moves downwardly and the bore increases in size provides a larger and larger opening so that it is at all times substantially proportionate to the force exerted by the coil springs 16.

Upon the cap 12 centrally thereof is arranged an attaching nipple 19 for a grease gun 20. This attaching nipple may be either of the screw or bayonet slot type, the latter being herein illustrated and includes the usual ball check 21 for sealing the inlet when the pressure from the grease gun is released. Extending downwardly from and forming a continuation of the bore 22 of this nipple is a pipe 23 free from perforations and having its lower end arranged at a point below the lowest level assumed by the piston 15. In operation, the cup is placed in position and being empty the piston 15 will be at the lower end of its movement. The grease gun is then attached to the nipple 19 and pressure applied to force grease within the cup. The grease entering the cup and because of its pressure will cause the plunger to move upwardly against its action of the spring until the spring is fully compressed at which time the plug 18 will be at that point in the tapered bore 13 where the effective outlet area is reduced to its minimum. If desired, the pressure from the gun can be continued after the cup is filled and this continued pressure will cause grease to be forced through the outlet and through the bearing which the cup is intended to lubricate. When a sufficient quantity of grease has been introduced, the gun is removed and the spring 16 then constitutes a means for feeding grease to the bearing. This spring will constantly urge the plunger 15 toward the outlet end of the body forcing the grease within it and as the strength of this spring decreases, the size of the outlet opening will decrease so that a substantially uniform quantity of grease will be fed from the cup during the entire period of its operation. In order that longitudinal adjustment of the lug 18 may be had with relation to the plunger, the means of connection between the plunger 18 and tube 17 illustrated is preferably employed. This connection is provided by threading the upper end of the tube for a considerable length and placing upon this tube lock nuts 24 and 25 engaging opposite sides of the plunger. The plunger is likewise threaded, as at 26, for engagement with the tube. In this manner, adjustment of the effective length of the tube may be had and accordingly a regulation may be had of the area of the tube which is presented as a passageway for a given position of the plunger. This enables a reduction of the amount of grease which is fed when the bearings with which the device is employed are roller bearings or other bearings where but a small amount of lubricant is necessary.

It will be obvious that a cup constructed in the foregoing may be very cheaply produced and because of its uniform operation will provide an ideal lubricating element for those bearings constantly requiring the feed of a given amount of lubricant. It will also be obvious that the structure hereinbefore set forth is capable of a considerable range of change and modification without in any manner departing from the spirit of our invention and we accordingly do not limit ourselves to such specific structure except as hereinafter claimed.

We claim:—

1. In a device of the type described, a grease cup comprising a body formed at one end with an outlet and provided at its opposite end with a cap, a plunger within the body, a spring between the cap and plunger urging the plunger toward the outlet end of the body, the outlet of the body having a bore decreasing in size as it approaches the body, means supported from the plunger and extending into such bore to thereby vary the effective area of the bore in proportion to the force exerted by the spring, and means for introducing grease under pressure to the body between the plunger and outlet end of the body and providing a guide for the plunger, comprising a grease gun nipple carried by the cap, a tube supported from the nipple and communicating with the bore thereof and having its lower end arranged adjacent the outlet end of the body, said tube being directed through said plunger, the support for said member comprising a perforated tube surrounding the first named tube.

2. In a device of the type described, a grease cup comprising a body formed at one end with an outlet and provided at its opposite end with a cap, a plunger within the body, a spring between the cap and plunger urging the plunger toward the outlet end of the body, the outlet of the body having a bore decreasing in size as it approaches the body, means supported from the plunger and extending into such bore to thereby vary the effective area of the bore in proportion to the force exerted by the spring, means for introducing grease under pressure to the body between the plunger and outlet end of the body and providing a guide for the plunger, comprising a grease gun nipple carried by the cap, a tube supported from the nipple and communicating with the bore thereof and having its lower end arranged adjacent the outlet end of the body, said tube being directed through said plunger, the support for said member comprising a perforated tube surrounding the first named tube, said perforated tube being adjustable through the plunger and means for securing the perforated tube in adjusted positions.

In testimony whereof we hereunto affix our signatures.

JOHN L. WILLIAMS.
FRANK L. WILLIAMS.